(12) United States Patent
Larkner et al.

(10) Patent No.: US 7,442,297 B2
(45) Date of Patent: Oct. 28, 2008

(54) REMOTE WATER DISPENSING DEVICE AND METHODS FOR OPERATING SUCH REMOTE WATER DISPENSING DEVICES

(75) Inventors: Thomas Joseph Larkner, Dubuque, IA (US); Joseph Francis Tilp, Dubuque, IA (US)

(73) Assignee: Barnstead/Thermolyne Corp., Dubuque, IA (US)

( * ) Notice: Subject to any disclaimer, the term of this patent is extended or adjusted under 35 U.S.C. 154(b) by 521 days.

(21) Appl. No.: 11/068,122

(22) Filed: Feb. 28, 2005

(65) Prior Publication Data

US 2006/0191829 A1 Aug. 31, 2006

(51) Int. Cl.
*B01D 21/24* (2006.01)

(52) U.S. Cl. .................... 210/194; 210/541; 141/392; 222/180

(58) Field of Classification Search ............ 222/74, 222/75, 180; 141/392; 210/541, 194
See application file for complete search history.

(56) References Cited

U.S. PATENT DOCUMENTS

| | | | | |
|---|---|---|---|---|
| 4,784,763 A | * | 11/1988 | Hambleton et al. ............ 210/90 |
| 5,143,601 A | | 9/1992 | Slovak et al. ................. 210/90 |
| 5,184,309 A | * | 2/1993 | Simpson et al. ............. 700/283 |
| 5,817,231 A | | 10/1998 | Souza ........................ 210/96.2 |
| 5,868,924 A | | 2/1999 | Nachtman et al. ............. 210/85 |
| 5,925,240 A | | 7/1999 | Wilkins et al. ................ 210/88 |
| 5,935,426 A | | 8/1999 | Giordano et al. .............. 210/87 |
| 5,988,435 A | | 11/1999 | Edwards et al. ................ 222/1 |
| 6,036,055 A | | 3/2000 | Mogadam et al. |
| 6,101,452 A | | 8/2000 | Krall et al. .................... 702/55 |
| 6,328,881 B1 | | 12/2001 | Larkner et al. ................ 210/87 |
| 6,379,560 B1 | | 4/2002 | Tilp et al. .................... 210/748 |
| 6,432,300 B2 | | 8/2002 | Larkner et al. ................ 210/87 |
| 6,546,795 B1 | | 4/2003 | Dietz |
| 6,571,151 B1 | | 5/2003 | Leatherman |
| 6,571,511 B1 | | 6/2003 | Plottnik ......................... 49/26 |
| 6,585,885 B2 | | 7/2003 | Larkner et al. ................ 210/87 |

(Continued)

OTHER PUBLICATIONS

Thomas Joseph Larkner, Methods for Wirelessly Operating Water Purification Systems, U.S. Appl. No. 11/537,351, filed 09/29/06.

(Continued)

*Primary Examiner*—Terry K Cecil
(74) *Attorney, Agent, or Firm*—Wood, Herron & Evans LLP

(57) ABSTRACT

A water dispensing device for dispensing water at a location remote from a water purification unit and methods of using the water dispensing device and methods of operating such remote water dispensing devices. The water dispensing device includes a dispensing gun, a support structure for the dispensing gun, and a manifold hydraulically coupling the water purification unit with the dispensing gun for supplying a stream of water from the water purification unit to the dispensing gun. The water dispensing device is also equipped with a flow control valve operative for selectively directing the stream of water from the manifold to the dispensing gun. Equipping the remote water dispensing device with a manifold and flow regulation device permits the flow of water to be regulated locally at the water dispensing device, in contrast to regulation only at the water purification unit.

35 Claims, 7 Drawing Sheets

U.S. PATENT DOCUMENTS

| | | | |
|---|---|---|---|
| 7,201,005 B2 * | 4/2007 | Voglewede et al. | 62/126 |
| 7,210,601 B2 * | 5/2007 | Hortin et al. | 222/144.5 |
| 2005/0096795 A1 | 5/2005 | Krieter et al. | |
| 2005/0268638 A1 * | 12/2005 | Voglewede et al. | 62/389 |
| 2006/0137090 A1 | 6/2006 | Jeffries et al. | |
| 2006/0191829 A1 | 8/2006 | Larkner et al. | |

OTHER PUBLICATIONS

Thomas Joseph Larkner, Wireless Water Purification Systems and Wireless Remote Dispensing Devices for Water Purification Systems, U.S. Appl. No. 11/537,630, filed 09/29/06.

Jeffrey Denoncourt, *Key Design Considerations for Total Lab Water Systems*, Laboratory Design, Jul. 2002, vol. 7, No. 7 (2 pages).

* cited by examiner

REMOTE WATER DISPENSING DEVICE AND METHODS FOR OPERATING SUCH REMOTE WATER DISPENSING DEVICES

FIELD OF THE INVENTION

The present invention relates generally to water purification systems and, more particularly, to a remote water usage or dispensing device for use with a water purification system and methods of operating such remote water dispensing devices.

BACKGROUND OF THE INVENTION

Standalone water purification systems, which have been commercially available for decades, are used principally in laboratory environments to provide highly purified and high quality reagent grade water for various applications, including the field of chemical analysis and physical testing. Water purification systems for these applications purify water by a number of well-known techniques, including filtration, single or multiple distillation, sorption, and ion exchange. Ordinary tap water contains a variety of impurities, including dissolved organics, dissolved inorganics, dissolved gases, suspended particles, microorganisms, and byproducts from bacterial degradation that must be removed using a water purification system to generate reagent grade water.

The purity of reagent water is graded according to various standards, including the commonly-accepted standard D1193-99el "Standard Specification for Reagent Water" established by the organization ASTM International (West Conshohocken, Pa.) and setting forth requirements for water suitable for use in methods of chemical analysis and physical testing. Under this familiar standard, the highest quality reagent water conforms to, or exceeds, ASTM Type I standards and is generally used in applications like high performance liquid chromatography (HPLC), atomic absorption (AA) spectrometry, and tissue culture. The ASTM Type II grade of reagent water, which has a lower purity than ASTM Type I reagent water, may be used for hematological, serological, and microbiological procedures. Reagent water suitable for general laboratory qualitative analyses, such as urinalysis, parasitology, and histological procedures, conforms to ASTM Type III standards. The ASTM Type IV grade of reagent water has the least stringent standards and is used in applications where these relaxed purity requirements are permitted.

Conventional water purification systems may include a purification unit that contains a pump that moves water under pressure through a fluid circuit and a water purification device capable of removing unwanted contaminants from water circulating in the fluid circuit. The water purification unit includes a manually-operated tap or dispensing valve positioned at a convenient location on the water purification unit that diverts purified water from the fluid circuit for fixed dispensing.

Certain applications dictate the need for a capability of dispensing water remote from the water purification unit. To extend the range of operation, in addition to the normal manually-operated dispensing valve, a separate and independent dispensing gun may be connected to the water purification unit by a length of flexible tubing that transports purified water from the water purification unit to the remote dispensing gun. The dispensing gun may be positioned relative to the stationary water purification unit within the spatial limits imposed by the length of the flexible tubing for remotely dispensing purified water.

Use of a remote dispensing gun in a water purification system also conserves space on the bench-top because the water purification unit can be positioned, for example, either under the bench, at the back of the bench, or high on a wall. In certain designs, the remote dispensing gun is removably supported in a bracket integrated into the purification unit and may be optionally used for fixed dispensing local to the purification unit when mounted in the bracket. When removed from the bracket and hand held to dispense purified water into a container, the remote dispensing gun must be gripped at all times while depressing a gun trigger or with the gun trigger locked.

Other remote dispensing guns include a wall-mounting bracket that holds the dispensing gun for fixed dispensing. Such wall-mounted brackets may include an articulated swing arm with rigid arm segments coupled by joints. One end of the swing arm is coupled with the bracket and the opposite end carries the dispensing gun. The swing arm can be extended from the bracket to physically separate the dispensing gun away from the wall. The dispensing gun may also be removed from the bracket and held for non-fixed dispensing.

Still other conventional water purification systems include a stand, which is a distinct support structure from the water purification unit, that sits on the bench top and supports the remote dispensing gun for fixed dispensing. These stands may include an articulated arm with multiple rigid segments united for relative movement by joints and a bracket for holding the dispensing gun positioned at the end of the articulated arm. Such stands are passive structures and do not include any electrical components for flow control or manifolds. A stream of purified water is continuously circulated through the tubing coupling the water purification unit with the dispensing gun and through the dispensing gun. When the dispensing gun is manually actuated, purified water is dispensed.

In another mode of operation, the remote dispensing gun may be locked in the opened position and purified water is supplied from the water purification unit for a time specified at the water purification unit. After the time lapses, water flow from the water purification unit to the remote dispensing gun is completely discontinued and the water purification unit is placed into a state in which water is no longer circulated. Any residual purified water remaining in the tubing coupling the water purification unit with the dispensing gun, in the dispensing gun, and in the fluid circuit inside the water purification unit is stagnant. The absence of circulation promotes bacterial growth and causes leaching from internal surfaces wetted by the static water. To reestablish water flow, a user must manually close the dispensing gun and restart the water purification unit.

In light of these and other problems in the art, it would be desirable to provide a remote dispensing device with local flow logic that cooperates with flow logic in the water purification unit to regulate water flow at the remote dispensing device.

SUMMARY OF THE INVENTION

In an embodiment of the present invention, a remote dispensing device comprises a dispensing gun capable of being hydraulically coupled with a water purification unit, a support structure configured to hold the dispensing gun at a location remote from the water purification unit, and an electrical component mechanically coupled with the support structure. The electrical component is operative for regulating a flow of a stream of water supplied from the water purification unit to the remote dispensing device. The electrical component is mounted to the support structure, which contrasts with conventional devices for holding dispensing guns that are merely passive mechanical structures supporting the dispensing gun. In such conventional water purification systems, all electrical components are integrated into the water purification unit and the remote dispensing device does not have electrical components that participate in regulating flow to the dispensing gun.

In another embodiment of the present invention, a remote dispensing device comprises a dispensing gun hydraulically coupled with a water purification unit and a support structure adapted to support the dispensing gun at a location remote from the water purification unit. The support structure includes a flexible arm extending between a fixed first end and a second end opposite the first end. A bracket, which supports the dispensing gun, is mechanically coupled with the second end of the flexible arm. The flexible arm has a construction capable of being bent into a curved shape relative to the fixed first end and between the first and second ends.

In another aspect of the present invention, a support for use with a water purification unit includes a flexible arm extending between a fixed first end and a second end opposite the first end. A bracket is mechanically coupled with the second end of the flexible arm and is adapted to support a dispensing gun hydraulically coupled with the water purification unit. The flexible arm has a construction capable of being bent into a curved shape relative to the fixed first end and between the first and second ends.

In another aspect of the present invention, a remote dispensing device comprises a support structure and a dispensing gun supported by the support structure at a location remote from a water purification unit. The dispensing gun is configured to be hydraulically coupled with the water purification unit for receiving a stream of water. The dispensing gun includes a flow control valve having a first state in which the stream of water is dispensed from the dispensing gun and a second state in which the stream of water is returned to the water purification unit. The remote dispensing device further includes an electronic control mounted to the support structure and electrically coupled with the flow control valve. The electronic control is operative for switching the flow control valve between the first and second states. The dispensing gun may be removably held by the support structure.

In another aspect of the present invention, a method is provided for operating a water purification system having a water purification unit and a remote dispensing device including a dispensing gun hydraulically coupled with the water purification unit and a support structure adapted to hold the dispensing gun. The method comprises positioning the support structure at a location remote from the water purification unit, supporting the dispensing gun with the support structure, and directing a stream of water from a fluid circuit of the purification unit to the remote dispensing device. The method further includes regulating a flow path for the stream of water to the dispensing gun by operation of an electrical component at the support structure. This method of operating the water purification system differs from conventional systems in which the support structure is not equipped with an electrical component capable of controlling the flow path to the dispensing gun.

In another aspect of the present invention, a method is provided for operating a water purification system having a dispensing device with a dispensing gun and a flow control valve having a flow path hydraulically coupling a water purification unit with the dispensing gun. The method comprises positioning the dispensing device at a location remote from the water purification unit and supplying a stream of water from the water purification unit to the flow control valve. The flow path is opened to direct the stream of water to the dispensing gun by operating the flow control valve under the control of the water purification unit and a volume of water is dispensed from the dispensing gun. The method further includes closing the flow path by operating the flow control valve under the control of the water purification unit after the volume is dispensed and continuously circulating the stream of water between the flow control valve and the water purification unit after the flow path is closed. This differs from conventional remote dispensing devices in that, after the volume of water is dispensed under the control of the water purification unit and the flow path to the dispensing gun is closed, water circulation continues between the water purification unit and the remote dispensing device.

In another aspect of the present invention, a method is provided for operating a water purification system including a remote dispensing device having a dispensing gun and an electrical component controlling a flow path from the water purification unit to the dispensing gun. The method comprises hydraulically coupling the remote dispensing device with the water purification unit to direct a stream of water from the water purification unit to the remote dispensing device and electrically coupling the electrical component of the remote dispensing device with the water purification unit to initially power the electrical component. When the electrical component is initially powered, the flow path to the dispensing gun is closed by operation of the electrical component.

These and other benefits and advantages of the invention shall become more apparent from the accompanying drawings and description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
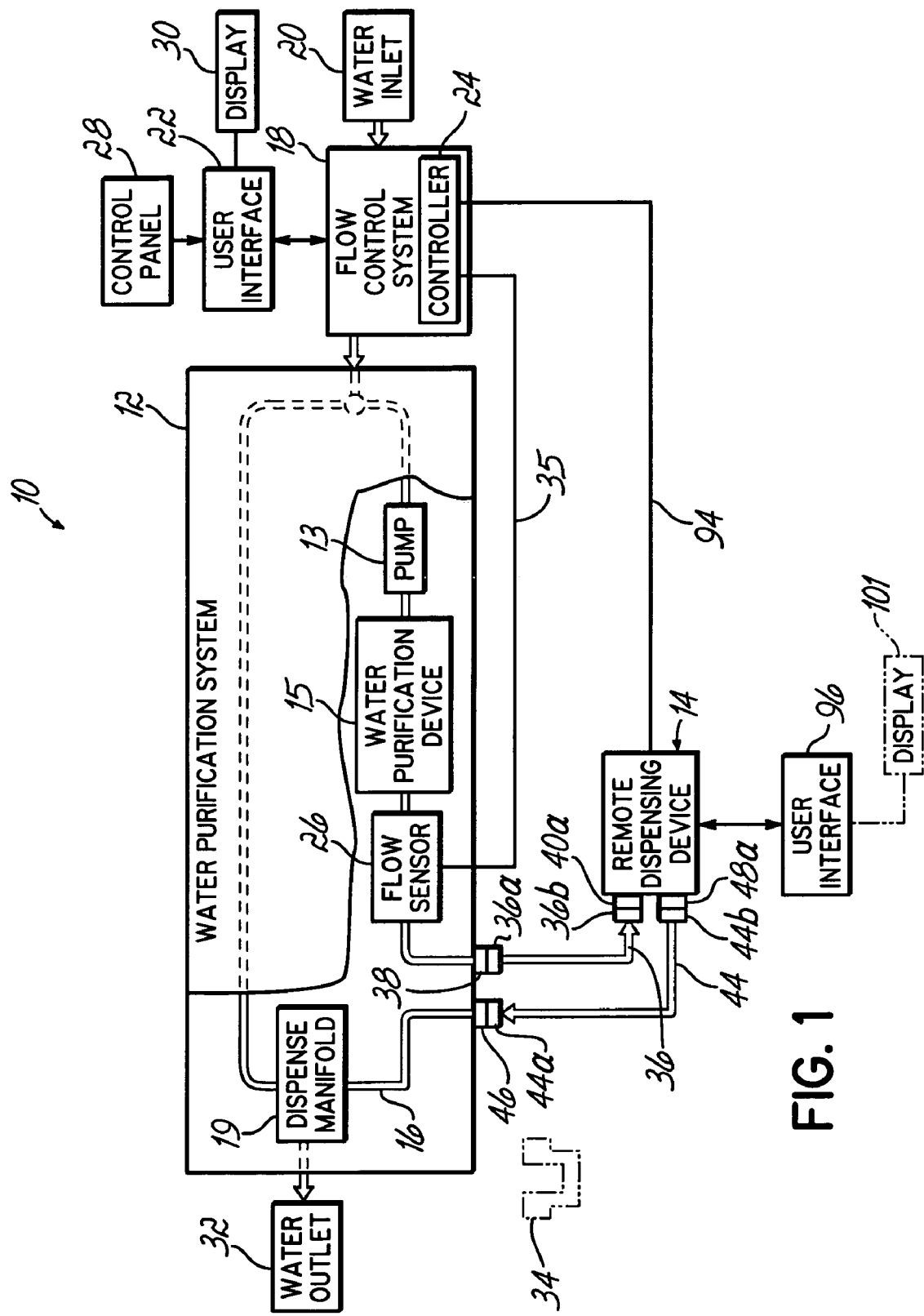
FIG. 1 is a diagrammatic view of a water purification system in accordance with the principles of the present invention, which includes a water purification unit and a remote dispensing device.
Figure 2:
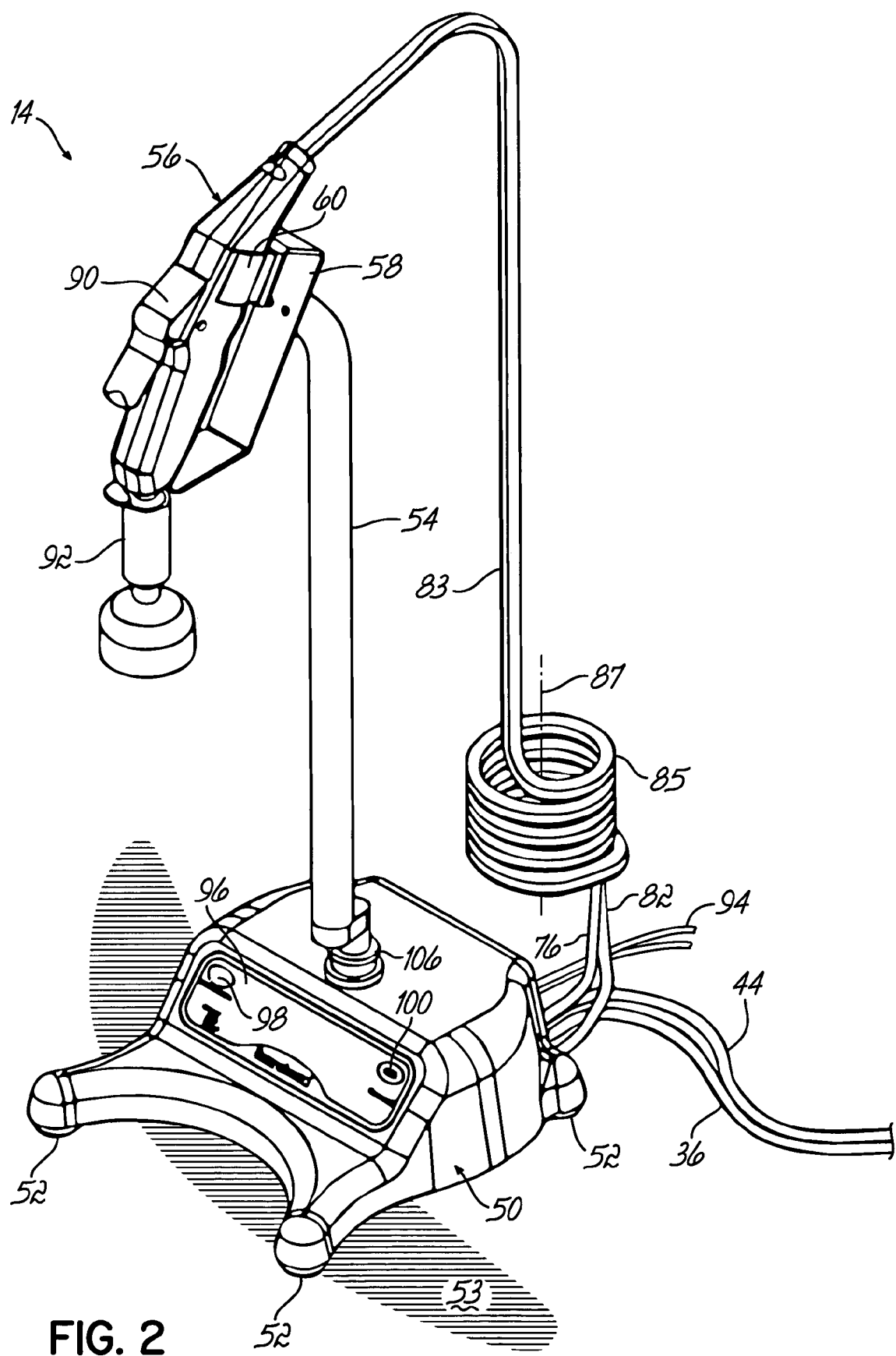
FIG. 2 is a perspective view of the remote dispensing device of FIG. 1.

With reference to FIGS. 1 and 2, a water purification system 10 includes a water purification unit 12 and a remote dispensing device 14 hydraulically coupled with the water purification unit 12. Water purification unit 12 includes a recirculating fluid circuit 16 equipped with various components, including a pump 13 and a water purification device 15, suitable for producing reagent grade water usable in methods of chemical analysis and physical testing, although the invention is not so limited. The pump 13 moves water through a purification medium of the water purification device 15 and continuously circulates water through the fluid circuit 16. An exemplary water purification device 15 is disclosed in U.S. Pat. No. 6,379,560, which is hereby incorporated by reference herein in its entirety. An exemplary water purification unit 12 is disclosed in commonly owned U.S. Pat. Nos. 6,328,881, 6,432,300, and 6,585,885, each of which is hereby incorporated by reference herein in its entirety. Water purification units 12 with which the remote dispensing device 14 may be used include the NANOpure DIamond Ultrapure Water Systems commercially available from Barnstead International (Dubuque, Iowa).

The water purification unit 12 further includes a flow control system 18 that interfaces the fluid circuit 16 with an inlet 20, which is connected by a feed line with a pretreated water source (not shown). The flow control system 18 includes a user interface 22 and a controller 24 coupled with the user interface 22. Software resident in a processor, such as a microprocessor, of the controller 24 and circuitry incorporated into the controller 24 implements commands entered on the user interface 22 to control the operation of the water purification system 10. The processor of the controller 24 receives instructions from a memory or like device, and executes those instructions, thereby performing a process defined by those instructions.

The controller 24 is electrically coupled by an electrical cable 35 to establish a communications link with a flow sensor 26. Flow sensor 26 is operative to generate an electronic signal proportional to water flow in the fluid circuit 16 or to amounts of purified water dispensed from the fluid circuit 16. The controller 24 uses the electronic signal received from the flow sensor 26 to determine a volume of purified water dispensed from the water purification unit 12. The user interface 22 includes a control panel 28 with input devices and controls such as a keypad, pushbuttons, etc. which are used to control the operation of the water purification unit 12. For example, a user manipulate the control panel of the user interface 22 enter a numerical value for a target volume of purified water to be dispensed from the fluid circuit 16 into the controller 24. Controller 24 stores the numerical value of the target volume for future use. The user interface 22 may include an output device or display 30 that indicates, for example, a volume of purified water dispensed, or to be dispensed, by the water purification system 10.

Any volume of purified water dispensed from fluid circuit 16 is replenished by pretreated water admitted by the flow control system 18 through the inlet 20. The flow control system 18 monitors the volume of purified water dispensed by the water purification system 10 and may provide an indication of the dispensed volume visible to the user on display 30. An exemplary flow control system 18 is disclosed in commonly owned U.S. Pat. Nos. 6,328,881, 6,432,300, and 6,585,885, incorporated by reference above.

The fluid circuit 16 includes a dispense manifold 19 with fluid flow components, such as a solenoid valve, interfaced with controller 24 for controlling the flow of purified water to an outlet 32 of the water purification unit 12 and for directing water through the fluid circuit 16 when the path to the outlet 32 is closed. Purified water may be dispensed, at the user's discretion, from the outlet 32 or at the remote dispensing device 14. The user initiates volumetrically controlled water dispensing from outlet 32 by actuating a switch (not shown) at water purification unit 12. The user initiates volumetric dispensing at the remote dispensing device 14 by actuating a switch 98 (FIG. 2) at the remote dispensing device 14.

The water purification unit 12 includes a removable jumper 34 that is coupled by hydraulic fittings with an outlet 38 and inlet 46 of the fluid circuit 16. The jumper 34 comprises a conduit that hydraulically connects the outlet 38 with the inlet 46 for continuous water flow through the fluid circuit 16. When the jumper 34 is disconnected, as shown in FIG. 1, the hydraulic fittings of the outlet 38 and inlet 46 are accessible for removably coupling the remote dispensing device 14 with the fluid circuit 16.

A flexible conduit 36 hydraulically couples the outlet 38 from the fluid circuit 16 with a passageway 40 (FIG. 5) defined in a manifold 42 of the remote dispensing device 14. Similarly, another flexible conduit 44 couples the inlet 46 to the fluid circuit 16 with a passageway 48 (FIG. 5) defined in the manifold 42. The flexible conduits 36, 44 include hydraulic fittings 36a, 44a appropriate to establish fluid couplings with the outlet 38 and inlet 46. Each of the flexible conduits 36, 44 is also provided with a hydraulic fitting 36b, 44b on its opposite open end configured to couple with corresponding fittings 40a, 48a on passageways 40, 48, respectively.

With reference to FIGS. 2-6, the remote dispensing device 14 includes a base 50, a flexible support arm or gooseneck 54 extending away from the base 50, and a manual dispensing gun or dispenser 56. The base 50 has sufficient mass and dimensions, in cooperation with the construction and arrangement of feet 52, to sit stable and stationary on a surface 53, such as a bench top, as the gooseneck 54 is adjusted to reposition the dispenser 56. The stability is maintained regardless of the initial and final positions of the dispenser 56. Projecting downwardly from the base 50 are feet 52, which support the remote dispensing device 14 on surface 53 and elevate the base 50 slightly above the surface 53. The gooseneck 54 may be manipulated for positioning the dispenser 56 relative to the base 50 while the dispenser 56 is mounted in a gripping member or spring clip 60 of a bracket 58. The base 50, gooseneck 54, and bracket 58 collectively constitute a support structure for the dispenser 56.

Figure 3:
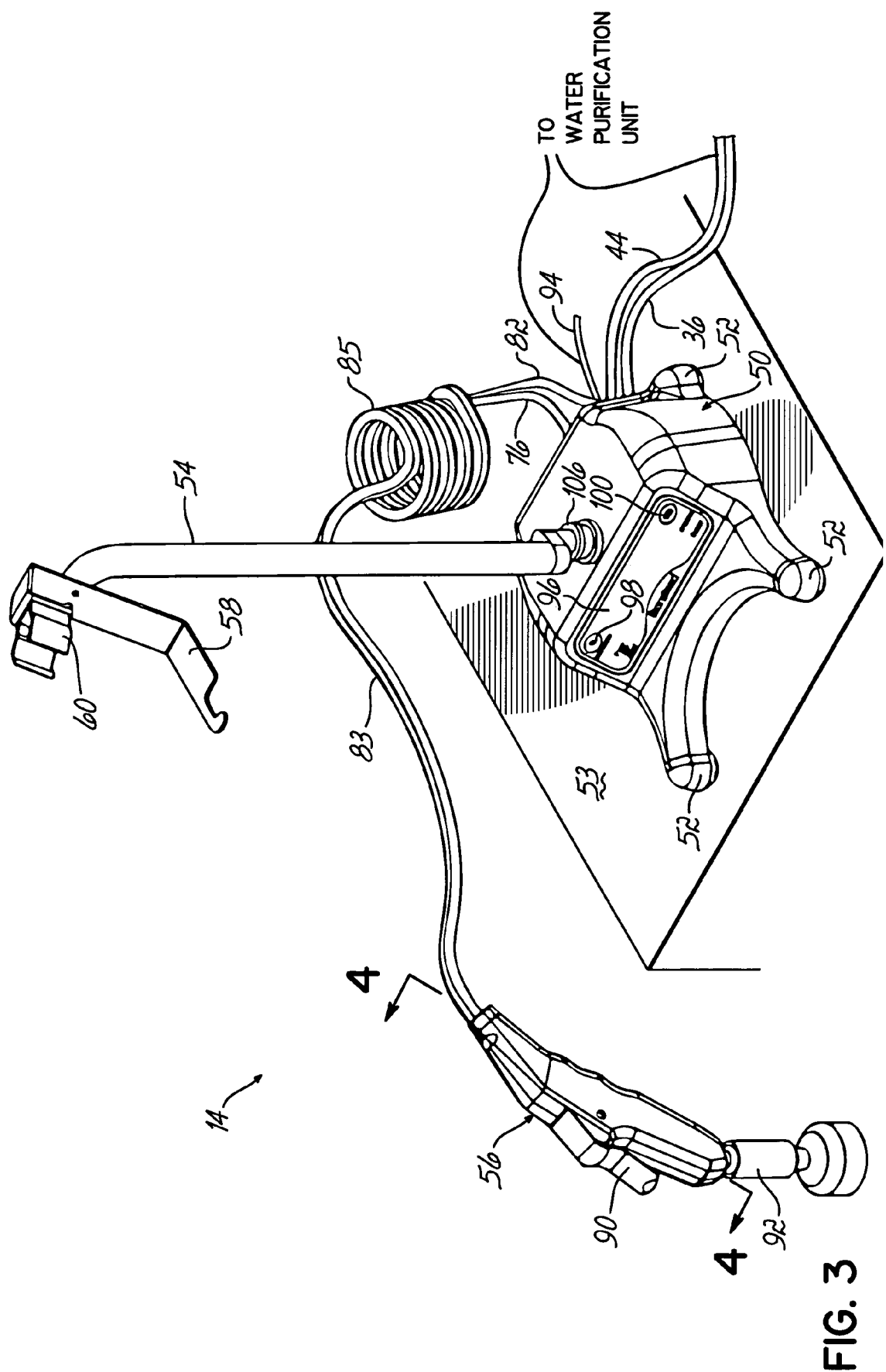
FIG. 3 is a perspective view similar to FIG. 2 in which a dispenser held by the remote dispensing device has been removed from its support bracket.

Spring clip 60 features confronting resilient arms between which the dispenser 56 is received and removably held. Each resilient arm has a degree of elasticity such that the arms of spring clip 60 may splay outwardly and relax inwardly to allow for the insertion and/or removal of the dispenser 56. The arms of spring clip 60 have a contour that conforms to the contour of the grasped region of dispenser 56 and shaped to secure the dispenser 56. As shown in FIG. 3, the dispenser 56 may also be removed from the spring clip 60 and held free of the gooseneck 54 while dispensing purified water transferred from the water purification unit 12 to the dispenser 56. In an alternative embodiment of the invention, the dispenser 56 may be non-removably held by the bracket 58.

Situated and contained inside the base 50 are the manifold 42, a flow control valve preferably in the form of a three port-two way solenoid valve 62, and a circuit board 64 with circuitry adapted to, among other things, power and switch the solenoid valve 62. Solenoid valve 62 is operative for controlling the flow path of purified water through the manifold 42. To that end, the solenoid valve 62 is configured with an inlet port 66 and a pair of outlet ports 68, 70 among which the internal switching mechanism (not shown) of solenoid valve 62 can select a path for directing a flow of the stream of purified water received from the water purification unit 12. The solenoid valve 62 and circuit board 64 collectively constitute a flow regulation device operative to open and close the flow path for the stream of purified water through the manifold 42, which selectively diverts the flow of the stream of purified water to the dispenser 56. The invention contemplates that other types of flow control valves, as understood by persons of ordinary skill, may be substituted for the solenoid valve 62.

The solenoid valve 62 preferably includes a flipper-style or rocker-style actuating mechanism, which represents the smallest package that allows for the highest flow with the lowest pressure drop. Flipper-style and rocker-style solenoid valves also maintain water purity because of a reduced number of parts in the water flow path, as compared with other types of solenoid valves. Flipper-style and rocker-style solenoid valves suitable for use in the invention are commercially available, for example, from Christian Bärkert GmbH & Co. KG (Ingelfingen, Germany).

Positioning the solenoid valve 62 inside the base 50 provides a compact structure, in contrast to mounting a solenoid valve on the gooseneck 54 or in the dispenser 56 that would require the gooseneck 54 to be much beefier and unwieldy to withstand the size and weight. If the solenoid valve 62 were incorporated into the dispenser 56, this might increase the size of the dispenser 56 to be non-ergonomic for handheld dispensing. Positioning the solenoid valve 62 inside the base 50 also provides a beneficial weight distribution, as the base 50 would need to be significantly heavier or hard mounted to surface 53 withstand the loads of the gooseneck 54, for example, when extended laterally over the surface 53 of a bench top to position the dispenser 56 to fill a container 108 (FIG. 8) situated on the floor beside the bench top or in a sink.

In addition to passageways 40 and 48, the manifold 42 further includes two additional passageways 72, 74 each having an external connection point defined in base 50, as do passageways 40, 48. Passageway 40 feeds the stream of purified water received through flexible conduit 36 from the water purification unit 12 to the inlet port 66 of the solenoid valve 62. Passageway 48, which is coupled with outlet port 68 of the solenoid valve 62, returns the stream of purified water through flexible conduit 44 to the water purification unit 12. Passageway 72, which is coupled with an outlet port 70 of the solenoid valve 62, is further coupled by a flexible conduit 76 with an inlet 78 (FIG. 4) to the dispenser 56. One open end of the flexible conduit 76 includes a hydraulic fitting 76a connected with the corresponding hydraulic fitting (not shown) situated in passageway 72 and the opposite open end of flexible conduit 76 is coupled with inlet 78.

Passageway 74, which is coupled by a connecting passageway 80 with passageway 48, is further coupled by a flexible conduit 82 with an outlet 84 (FIG. 4) from the dispenser 56. One open end of the flexible conduit 82 includes a hydraulic fitting 82a connected with the corresponding hydraulic fitting (not shown) situated in passageway 74 and the opposite open end of flexible conduit 82 is coupled with outlet 84. Located in passageway 74 before its intersection with connecting passageway 80 is a check valve 86 that prevents backflow through passageway 74 into flexible conduit 82 when passageway 72 is closed by the solenoid valve 62 to block the flow loop to the dispenser 56. The check valve 86 also provides any necessary back pressure for a valve 88 (FIG. 4) inside the dispenser 56. The flexible conduits 76, 82 are confined inside a sheath 83 that extends from a point near the manifold 42 to the dispenser 56. The present invention contemplates that the flexible conduits 76, 82 may be replaced by a single conduit (not shown) having dual lumens and the sheath 83 may be optionally omitted.

The conduits 76, 82 and sheath 83 may have a coiled section, generally indicated by reference numeral 85, that uncoils from a stored condition when the dispenser 56 is moved to a location remote from the gooseneck 54 and bracket 58. The coiled section 85 is tightly wound and compact when the dispenser 56 is mounted in the spring clip 60 but extends the effective length of the conduits 76, 82 and sheath 83 by partially or totally uncoiling for relocating dispenser 56 away from its spring clip 60. The coiled section 85 is shaped generally as a helix having individual turns that are circular and wound spirally about a central longitudinal axis 87. In the stored condition, adjacent turns of the coiled section 85 are abutting or substantially abutting to define a compact arrangement. When elongated, the coils in the coiled section 85 are spaced apart to effectively lengthen the conduits 76, 82 and sheath 83. When the dispenser 56 is returned to the spring clip 60, the coils of the coiled section 85 reassemble, or substantially reassemble, to their stored condition.

Figure 4:
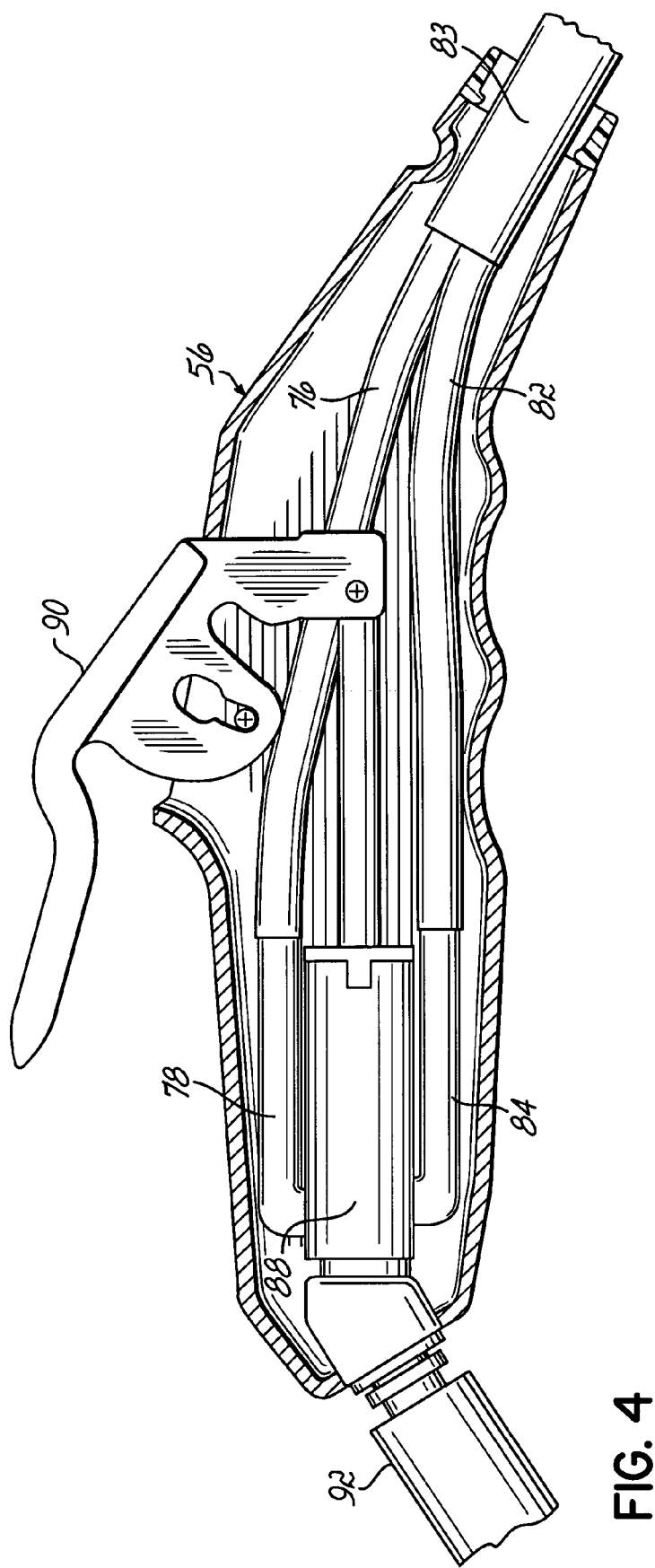
FIG. 4 is a cross-sectional view of the dispenser of the remote dispensing device taken generally along line 4-4 in FIG. 3.

As best shown in FIG. 4, the valve 88 of the dispenser 56 is operated by manually actuating or otherwise depressing an external trigger 90. When the dispenser 56 is suitably positioned at a point of use and the valve 88 is opened, a stream of purified water is dispensed through a point-of-use filter 92 having a pore size appropriate for capturing bacteria and particulates. Such dispensers 56 are described, for example, in commonly owned U.S. Pat. No. 5,988,435, which is hereby incorporated by reference herein in its entirety. However, persons of ordinary skill will recognize that any type of recirculating dispenser 56 may be used with the remote dispensing device 14. It should be noted that the water purification unit 12 and remote dispensing device 14 cooperate to control dispensing of purified water from the dispenser 56. In certain embodiments of the present invention, dispenser 56 may be replaced by a dispenser (not shown) that is incapable of recirculation, in which case only one of the water conduits 76, 82 will be required for transferring purified water to the dispenser 56.

Persons of ordinary skill will appreciate that an existing dispenser, similar to dispenser 56, may be retrofitted for use with the remote dispensing device 14 by modifying the fluid connections with the water purification unit 12 of the existing water purification system 10. This is particularly advantageous for converting conventional water dispensing systems in which the remotely-positionable dispensing gun 56 is merely connected to the water purification unit 12 by a length of flexible tubing to a setup in which the advantages of the remote dispensing device 14 are manifest.

Circuitry is provided on both the controller 24 of flow control system 18 and the circuit board 64 for communicating information between the devices. Circuit board 64 and controller 24 communicate over an electrical cable 94 for transmitting command and information electrical signals between the water purification unit 12 and the remote dispensing device 14. Electrical power is also supplied over electrical cable 94 from the water purification unit 12 to the remote dispensing device 14. A connector 95 couples the electrical cable 94 with the circuit board 64 to establish the requisite communications link. The remote dispensing device 14 includes a user interface 96 having a control panel with electronic controls or switches 98, 100 coupled with the circuitry of circuit board 64 and accessible to the user to, for example, initiate water dispensing and to select between different modes of operation for remote dispensing device 14. The circuitry of the circuit board 64 may be implemented using analog or digital circuit components, or a programmable microcomputer control that operates in response to stored program instructions as well as signal inputs to the user interface 96. Switches 98, 100 may be any suitable electrical switch such as membrane switches constructed from two non-conducting stacked films in which one film carries adjacent, spaced electrodes and the other film is adapted to close a conductive path between the electrodes when the films are pressed together by a user's touch. The user interface 96 is interfaced by an internal ribbon cable (not shown) with the circuit board 64, which communicates selections made using the switches 98, 100 at the user interface 96 to the circuitry of circuit board 64 and, optionally, over electrical cable 94 to the controller 24 to communicate, for example, a user request to initiate dispensing in the volumetric operation mode.

The remote dispensing device 14 differs from conventional remote dispensing devices in that electronic or electrical components relating to operation of the water purification system 10 are physically located at, supported by, and integrated into the construction of, the remote dispensing device 14. In particular, remote dispensing device 14 has electronic or electrical components including, but not limited to, solenoid valve 62, circuit board 64, and user interface 96 with switches 98, 100 that are electrically powered. Other switches and displays are contemplated by the invention as being integrated into the construction of the remote dispensing device 14. The remote dispensing device 14 also differs in that the manifold 42 and solenoid valve 62 permit the purified water flow path to the dispenser 56 to be switched and controlled locally at the remote dispensing device 14.

Switch 100 of the user interface 96 may be operated by the user to select between various modes, such as a manual mode of operation and an automatic or volumetric mode of operation, for operating remote dispensing device 14. Switch 98 of the user interface 96 may be operated by the user to initiate dispensing from dispenser 56 after the user has used switch 100 to select the volumetric operation mode.

User interface 96 may optionally include an electrical control (not shown) similar to switches 98, 100, such as a keypad with a volume increment switch and volume decrement switch, for programming the target volume of dispensed purified water. User interface 96 may also optionally include a visual indicator or display 101 (FIG. 1) operative to display the target volume to the user at the location of the remote dispensing device 14. The target volume inputted using user interface 96 is communicated over electrical cable 94 from the circuitry of circuit board 64 to the controller 24 of the flow control system 18 located at the water purification unit 12. In this manner, the user can remotely set the target volume at the location of the remote dispensing device 14 and communicate that selection to the water purification unit 12 for use by controller 24 of the water purification unit 12 in performing a volumetric dispense.

Figure 7A:
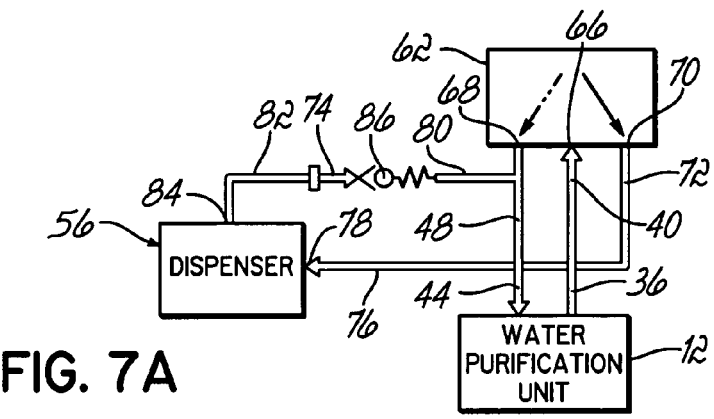
FIGS. 7A and 7B are diagrammatic hydraulic circuits illustrating the manual and volumetric operation modes for the water purification system of FIG. 1.

With reference to FIGS. 2 and 7A, switch 100 of the user interface 96 may be used to select the manual mode of operation for remote dispensing device 14 in which the solenoid valve 62 is continuously energized. The solenoid valve 62 closes outlet port 68 and opens outlet port 70 when energized. As a result, purified water is directed from passageway 40 through passageways 72, 74 in a flow path through the dispenser 56 and including conduits 76, 82. The continuous recirculation of the purified water in the water purification system 10 between the water purification unit 12 and the remote dispensing device 14 and through the dispenser 56 alleviates water stagnation, which prevents or, at the least, minimizes bacterial growth.

Figure 8:
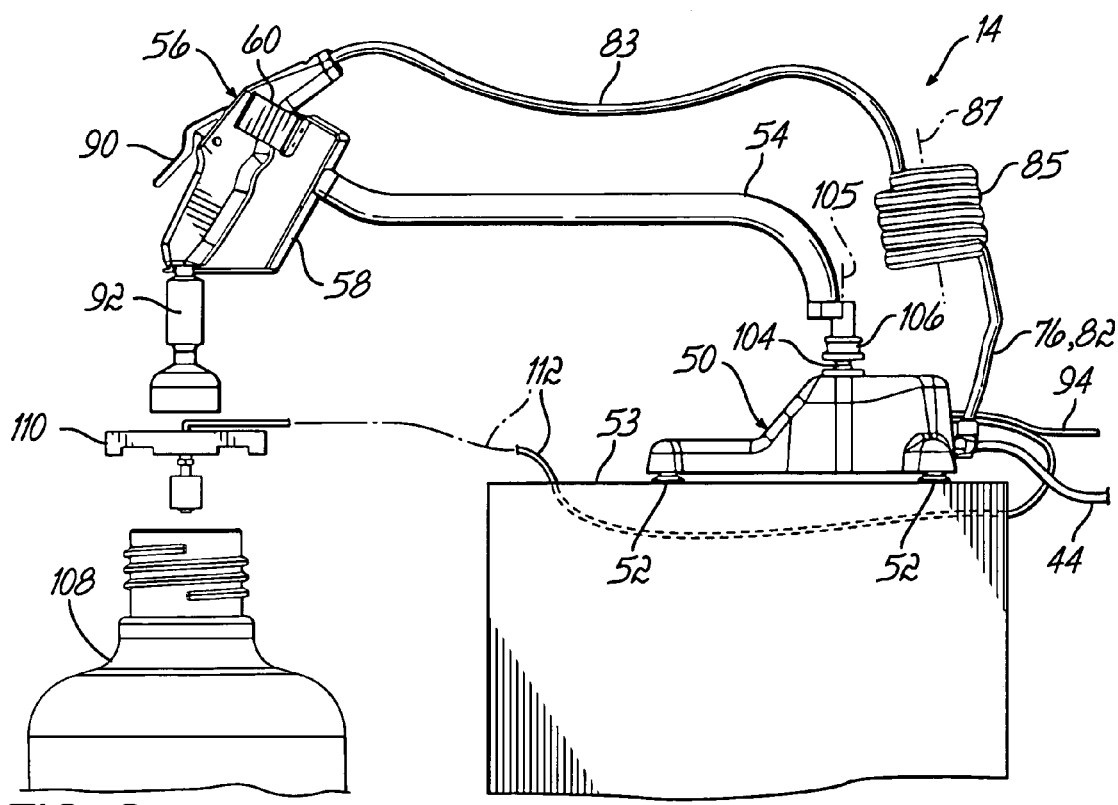
FIG. 8 is a perspective view similar to FIG. 2 in which a gooseneck of the remote dispensing device has been positioned for dispensing into a container positioned adjacent to a side edge of a bench top supporting the remote dispensing device.

The dispenser 56 may be gripped by a human hand, removed from the spring clip 60 of bracket 58 atop gooseneck 54, as shown in FIG. 3, and oriented relative to a container 108 (FIG. 8) intended to collect the stream of purified water dispensed through filter 92. Alternatively, the dispenser 56 may remain engaged with the spring clip 60. Purified water flowing through passageway 74 is directed through passageway 48 and returned through conduit 44 to the fluid circuit 16 (FIG. 1) of the water purification unit 12. When the valve 88 (FIG. 4) of the dispenser 56 is operated by depressing external trigger 90, purified water is dispensed on demand through the filter 92 and into the container 108 (FIG. 8). In the manual operation mode, there is no targeted volume for dispensed purified water as dispensing continues until the trigger 90 is released. Dispensing is discontinued when the external trigger 90 is released to close the valve 88.

Figure 7B:
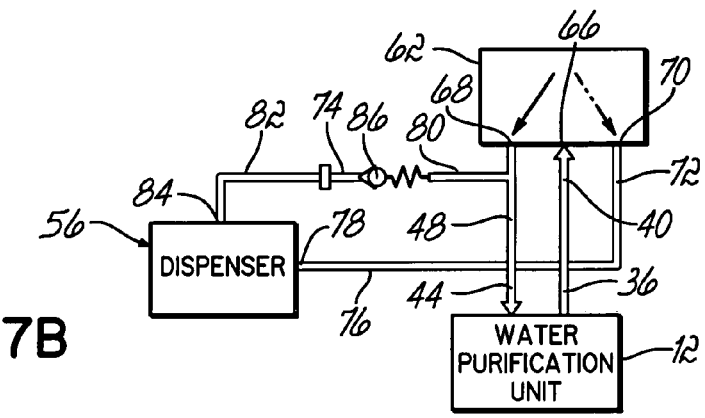

With reference to FIGS. 2 and 7B, switch 100 of the user interface 96 may be operated by the user to select the volumetric mode of operation for remote dispensing device 14. In the volumetric operation mode, the solenoid valve 62 remains de-energized until commanded on by a trigger signal transmitted from the controller 24 of the water purification unit 12 over electrical cable 94 to the circuitry of circuit board 64. While the solenoid valve 62 is de-energized, outlet port 70 is closed and outlet port 68 is opened to provide a recirculation path across flexible conduits 36, 44 between the water purification unit 12 and the remote dispensing device 14. Purified water is not directed to the dispenser 56 until instructed by a command signal from the controller 24. After the gooseneck 54 is manipulated to position dispenser 56 relative to container 108 (FIG. 8) for hands-free fixed dispensing or the dispenser 56 is held manually at a location for non-fixed dispensing, the trigger 90 is manually locked to open the valve 88 (FIG. 4). Because the solenoid valve 62 remains de-energized, purified water continues to circulate through flexible conduits 36, 44 between the water purification unit 12 and the remote dispensing device 14.

A user inputs a target volume of dispensed water into the controller 24 at the user interface 22 of the water purification unit 12 using control panel 28. Switch 98 of the user interface 96 of remote dispensing device 14 may be operated by the user to communicate an electronic signal to the water purification unit 12 requesting initiation of a volumetric dispenser cycle. After the request is received, the controller 24 of flow control system 18 instructs the circuit board 64 to energize the solenoid valve 62. To that end, the controller 24 communicates a trigger command signal over electrical cable 94 to the circuit board 64, which instructs the circuitry of circuit board 64 to energize the solenoid valve 62. Energizing the solenoid valve 62 closes outlet port 68 and opens outlet port 70, which opens the flow path for purified water to the dispenser 56 as shown in FIG. 7A. Purified water is immediately diverted through outlet port 70 of the solenoid valve 62 to passageway 72 of manifold 42 and through conduit 76 to dispenser 56 in a flow path destined for subsequent dispensing through filter 92.

Because the valve 88 (FIG. 4) is open, a volume of purified water corresponding to the target volume of water is dispensed from the dispenser 56 into container 108 (FIG. 8). The controller 24 monitors the incremental volume of dispensed purified water based upon the command signal provided from the flow sensor 26 to the controller 24 and based upon fluid flow in fluid circuit 16. When the controller 24 determines that the dispensed volume equals the target volume, the controller 24 of the flow control system 18 de-energizes solenoid valve 62. To that end, the controller 24 communicates a second command signal to the circuitry of circuit board 64 that instructs the circuit board 64 to de-energize the solenoid valve 62. When returned to the de-energized state, the outlet port 70 of solenoid valve 62 is closed and the outlet port 68 of solenoid valve 62 is opened to close the flow path to the dispenser 56 and to re-establish the recirculation path between the water purification unit 12 and the remote dispensing device 14, as shown in FIG. 7B.

The water purification system 12 includes features effective to prevent inadvertent water discharge from the remote dispensing device 14 when initially electrically coupled with the water purification unit 12. When electrical cable 94 is initially connected to water purification unit 12 or the water purification system 10 is initially powered up with electrical cable 94 connected, the circuit board 64 of the remote dispensing device 14 automatically selects the volumetric operational mode in which the solenoid valve 62 is de-energized. If the remote dispensing device 14 were permitted to power up in manual mode, there would be a risk of dispensing of purified water from dispenser 56 if the trigger 90 is manually locked on power-up. Instead, purified water is continuously circulated between the water purification unit 12 and the remote dispensing device 14 across flexible conduits 36, 44.

When the remote dispensing device 14 is initially powered, the electrical components of the remote dispensing device 14 may communicate a spurious electrical signal over electrical cable 94 to the water purification unit 12. If not prevented, the water purification unit 12 could interpret this electrical signal as a request to initiate a volumetric dispense cycle by sending an electrical signal command to the circuitry of circuit board 64. The circuitry of circuit board 64 is waiting in the volumetric operation mode for a trigger command to initiate water dispensing.

To combat the effect of such spurious electrical signals, controller 24 instructs the flow control system 18 to ignore dispense requests received from the remote dispensing device 14 for a fixed time period of, for example, six seconds, after electrically coupling the remote dispensing device 14 with the water purification unit 12. To that end, the controller 24 of the water purification unit 12 includes software and circuitry that recognizes when the electrical components of the remote dispensing device 14 are coupled electrically with the water purification unit 12 and that rejects any electrical signal communicated from the electrical components of the remote dispensing device 14 over electrical cable 94 to the water purification unit 12 if received within the initial time interval. Controller 24 may query the circuitry of circuit board 64 as to the propriety of the dispense request and the circuitry of circuit board 64 may respond by forwarding an automatic cancellation command to the controller 24 if the dispense request is found to be spurious.

Figure 5:
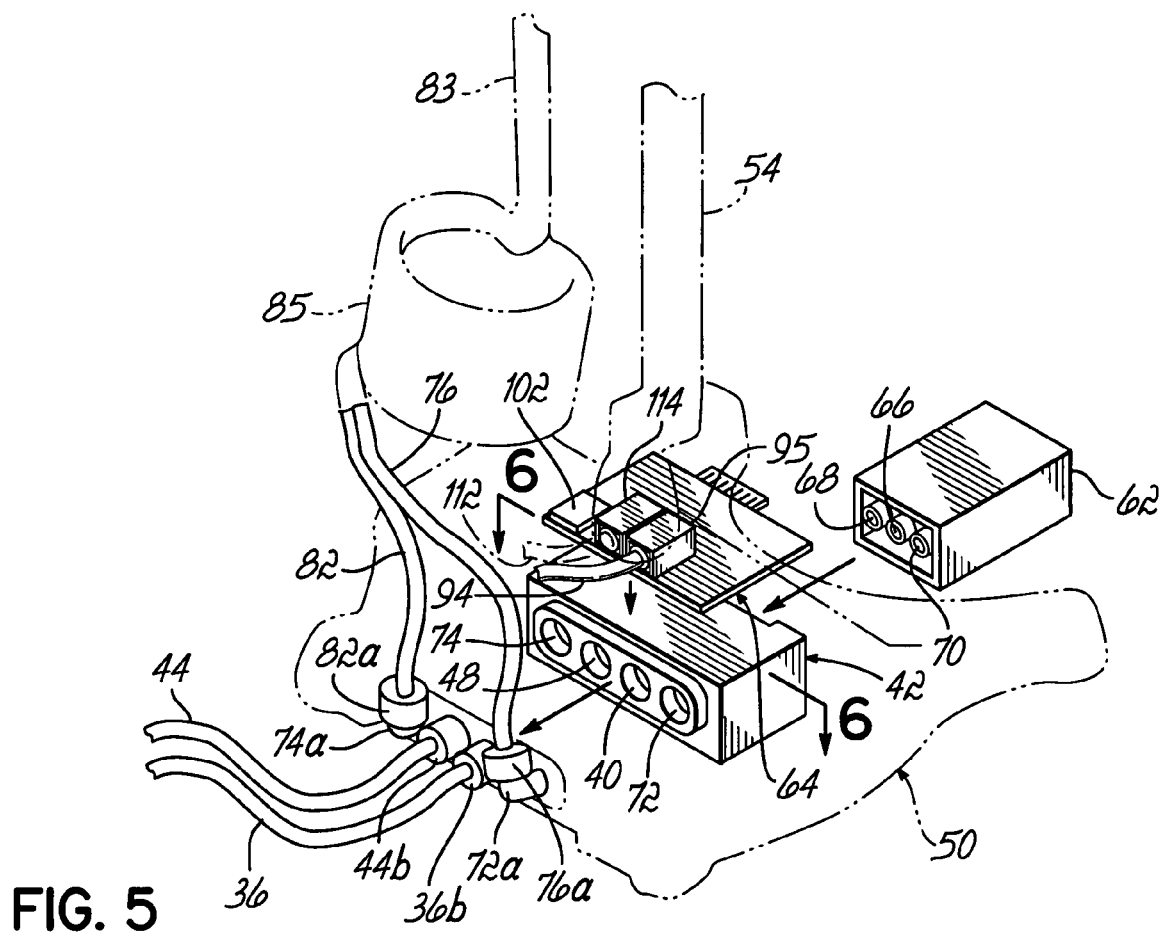
FIG. 5 is an exploded view of the components inside a base of the remote dispensing device.
Figure 6:
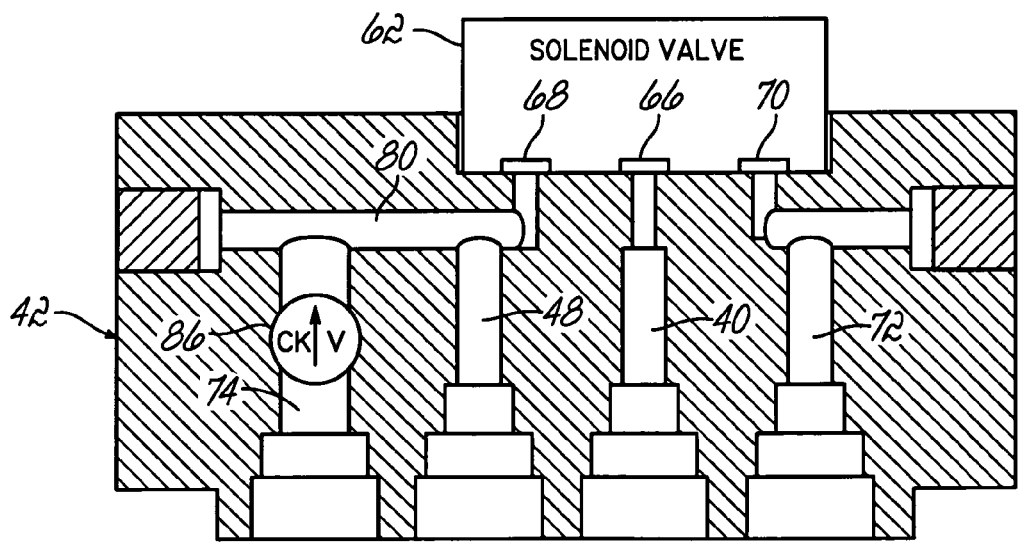
FIG. 6 is a cross-sectional view of a manifold of the remote dispensing device taken generally along line 6-6 in FIG. 5.

With reference to FIGS. 2 and 5, the solenoid valve 62 has a much higher pull-in or closure current requirement than hold current requirement. As a result, a pulse-width modulated (PWM) solenoid driver 102, such as the DRV101T manufactured by Texas Instruments Incorporated (Dallas, Tex.) or any other suitable commercially available PWM solenoid driver, may be implemented in the circuitry of the circuit board 64. Such PWM solenoid drivers 102 fulfill the closure and hold current requirements with beneficial results by varying the duty cycle of the operation of the solenoid valve 62. To that end, the PWM output of the solenoid driver 102 provides a strong initial closure of the solenoid valve 62 and then automatically switches to a hold mode at a lower power. For example, the hold current provided to solenoid valve 62 from the solenoid driver 102 may be reduced, after switching, to approximately 25% of the closure current.

Operating the energized solenoid valve 62 with pulse-width modulation conserves power and reduces heat rise in the energized solenoid valve 62, which improves the reliability of the solenoid valve 62. The reduced heat transfer from the solenoid valve 62 to the manifold 42 and base 50 also reduces the operating temperature of the remote dispensing device 14. This reduction in operating temperature minimizes undesirable effects such as causing expansion/contraction tubing leaks, heating the purified water, and elevating the touch temperature of the exposed exterior surfaces of the remote dispensing device 14.

With reference to FIGS. 2 and 8, the gooseneck 54 may have any flexible construction capable of assuming a lengthwise curved or bent configuration such that, while in the bent configuration, a degree of rigidity and control is present that resists further bending under the load of the dispenser 56 and bracket 58. The flexible gooseneck 54 is manually positionable relative to a rigid base 104 to place the dispenser 56 and bracket 58 in a desired position from among a plurality of positions, but position retentive so that the dispenser 56 remains stationary once adjusted to a desired position. In one embodiment, the flexible gooseneck 54 comprises a vinyl-clad, loosely wound spring that extends along an axial length between first and second ends. Flexible gooseneck 54 is movable among the different positions, including but not limited to the approximately 90° bending shown in FIG. 8, by virtue of being capable of being bent or curved along its length.

The flexible gooseneck 54 and bracket 58 constitute an arm assembly that is attached to a coupler 104 rigidly coupled with base 50 by a gimbal or rotatable coupling 106. The flexible gooseneck 54 freely rotates about rotatable coupling 106 for rotating the dispenser 56, when attached to the bracket 58, in a plane parallel to surface 53 to establish a desired positioning. The gooseneck 54, which preferably has a single non-rigid segment, is free of joints along its length other than the rotatable coupling 106 that is attached to one end of gooseneck 54, and is not an articulated arm including multiple rigid segments in which adjacent segments are joined together by a joint. The gooseneck 54 is free to rotate through a full 360° arc about a vertical axis 105 (FIG. 8) of the rotatable coupling 106, which provides greater freedom in positioning the gooseneck 54 relative to base 50 and which may extend the operational lifetime of the gooseneck 54 by, for example, accommodating relaxation of a constituent spring.

Replacement of a worn gooseneck 54 is simplified by the construction of the arm assembly. To that end, the bracket 58 is unfastened from the worn gooseneck 54, the rotatable coupling 106 is detached from coupler 104, the bracket 58 is fastened to a new gooseneck 54, and the rotatable coupling 106 is re-attached to coupler 104. In an exemplary embodiment, the gooseneck 54 is hollow with an outside diameter of about 0.675", an inside diameter of about 0.325", a length of about 18 inches, and a spring wire size of 0.155". This combination of parameters allows for vertical mounted loads of approximately 3.4 pounds and horizontal loads of approximately 1.6 pounds. A manufacturer of goosenecks suitable for use as gooseneck 54 is Moffatt Products, Inc. (Watertown, S. Dak.).

The invention contemplates that, in an alternative embodiment of the present invention, the gooseneck 54 may mechanically couple the bracket 58 directly with a housing (not shown) of the water purification unit 12, rather than with base 50, to define a support structure for the dispenser 56. This alternative embodiment does not involve the use of a remote dispensing device 14 as the gooseneck 54 is directly coupled with the water purification unit 12 and depends from the water purification unit 12 for positioning the dispenser 56 relative to the water purification unit 12 for filling a container 108 (FIG. 8) positioned on the surface 53 adjacent to the water purification unit 12 or beyond a side edge of a bench top supporting the water purification unit 12.

With reference to FIG. 8, the flexible gooseneck 54 can be advantageously positioned such that the dispenser 56 is located beyond the side edge of the bench top or surface 53 supporting the base 50. This permits a user to fill the container 108, such as a carboy or flask, positioned adjacent to the edge of the support surface 53 and which may be too large to be positioned directly on the support surface 53 for filling.

A water level sensor, illustrated as a float 110 but not so limited, may be placed inside the container 108 receiving the stream of purified water dispensed from the dispenser 56 through filter 92. The water level sensor 110 is electrically coupled with the circuitry of the circuit board 64 inside the remote dispensing device 14 as a safety measure. Signals are transmitted from the water level sensor 110 by an electrical cable 112 to an externally accessible connector 114 coupled with the circuit board 64 inside the remote dispensing device 14. If the container 108 reaches or exceeds a maximum fluid level, the circuit board 64 may de-energize the solenoid valve 62 to discontinue flow to the dispenser 56. When operating the remote dispensing device 14 in the volumetric operation mode, this feature is particularly useful, for example, if the target volume of purified water to be dispensed unintentionally exceeds the fluid capacity of the container 108. Optionally, the electrical cable 112 from the water level sensor 110 may be coupled directly with the water purification unit 12 so that water level information is supplied to the controller 24 of the flow control system 18.

If the remote dispensing device 14 is operating in manual mode, water level sensor 110 may be used in conjunction with the electrical components of remote dispensing device 14 to dispense one or more target volumes of purified water from dispenser 56 without the command control of the controller 24 of water purification unit 12. Switch 100 is used to select the manual operation mode to continuously energize solenoid valve 62, the dispenser 56 is positioned relative to the opening to the reservoir of container 108, and the external trigger 90 of dispenser 56 is locked to open the valve 88 (FIG. 4). Purified water is then continuously dispensed through point-of-use filter 92 into container 108. Water will continue filling container 108 until water level sensor 110 engages or actuates, which indicates that a volume of water less than or equal to a fluid capacity of the container 108 has been dispensed. When water level sensor 110 engages and an electronic signal is communicated over cable 112 to the circuitry of circuit board 64, circuit board 64 will automatically place remote dispensing device 14 into the volumetric operation mode without pressing switch 100 but with the same effect. The solenoid valve 62 is de-energized.

In this manner, container 108 is filled with a fixed volume of purified water independent of the volume of the container 108 and without communicating with controller 24 of flow control system 18 at the water purification unit 12, which may make this dispensing mode independent of the flow control system 18 for a volumetric-type dispense. The only user requirement during this volumetric-type dispense is to ensure water purification unit 12 is operating and, preferentially, verify that the purity is above a needed purity set point, which may be set by the user at user interface 22.

The purity of the water circulating in fluid circuit 16 is an attribute that the water purification unit 12 may monitor on a continuing basis. Water purity may be judged by monitoring, for example, water resistivity of the water circulating in the fluid circuit 16. In an alternative embodiment of the present invention, the water purification unit 12 may communicate to the circuit board 64 whether or not water purity exceeds a threshold purity set point. The controller 24 of flow control system 18 may command the circuitry on circuit board 64 to de-energize solenoid valve 62 and prematurely discontinue dispensing from dispenser 56, if the remote dispensing device 14 is operating in manual mode, dispenser 56 is locked open, and water purity drops below the purity set point during the manual dispense. The remote dispensing device 14 reverts into volumetric mode with the solenoid valve 62 de-energized. In addition, the water purification unit 12 may communicate a command signal to the circuitry on circuit board 64 that permits user entry on switch 100 to change from volumetric mode to manual mode only if purity exceeds the purity set point. As a result, a user cannot dispense purified water if the purity does not exceed the purity set point. In addition, the water purification unit 12 may provide a command signal to the circuitry of circuit board 64 that disables the effect of switches 98, 100 of a control panel of the user interface 96 and, thereby, prevents dispensing from dispenser 56 if the water purification unit 12 is not in an operational mode.

Figure 9:
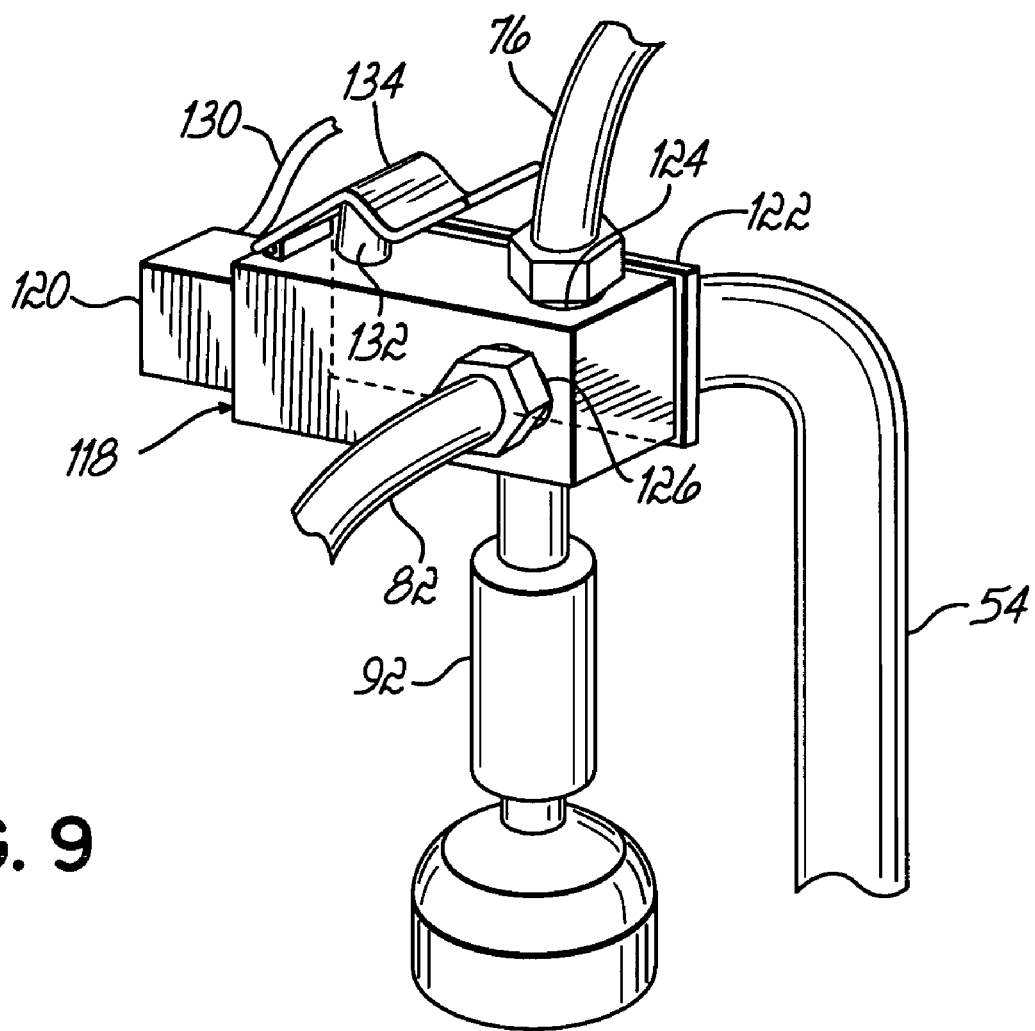
FIG. 9 is a view of a portion of a remote dispensing device in accordance with an alternative embodiment of the present invention.

In an alternative embodiment of the present invention and with reference to FIG. 9 in which like reference numerals refer to like features in FIGS. 1-8, a dispenser 118 is provided that replaces dispenser 56 (FIG. 2) and solenoid valve 62 (FIG. 5) in remote dispensing device 14 and is typically used for fixed dispensing. The dispenser 118 includes a solenoid valve 120, similar to solenoid valve 62, attached by a bracket 122 to the free end of gooseneck 54. The solenoid valve 120 includes an inlet port 124 coupled hydraulically by conduit 76 with passageway 72 of manifold 42 and an outlet port 126 coupled hydraulically by conduit 82 with passageway 74 of manifold 42. The switching mechanism (not shown) inside solenoid valve 120 is electrically coupled by an electrical cable 130 with circuit board 64. The electrical cable 130 may be routed to the base 50 (FIG. 2) through a hollow interior of the gooseneck 54 (FIG. 2).

Purified water is dispensed from the dispenser 118 through point-of-use filter 92, which is coupled hydraulically by another outlet port 128 of the solenoid valve 120 with inlet port 124 when the solenoid valve 120 is energized. Solenoid valve 120 is sufficiently lightweight so as to impose reasonable design requirements on gooseneck 54 and, in addition, base 50 may be enlarged, or otherwise reconfigured, so as to provide stable support on surface 53 because of the potential increase in the load supported at the free end of gooseneck 54.

When the remote dispensing device 14 is operating in volumetric mode, solenoid valve 120 is switched, in a manner similar to that described above for solenoid valve 62, to dispense purified water through outlet port 128 and point-of-use filter 92. The solenoid valve 120 preferably includes a manual actuation mechanism 132, in addition to the normal electrical actuation mechanism relied upon when the remote dispensing device 14 is operating in volumetric mode, for manual dispensing when the remote dispensing device 14 is operating in manual mode. The manual actuation mechanism 132 is operated by depressing an external trigger 134, which causes purified water to be dispensed on demand through outlet port 128 and point-of-use filter 92. In the manual operation mode, there is no targeted volume for dispensed purified water as dispensing continues until the trigger 134 is released. Purified water is continuously flowing between the outlet 38 and inlet 46 of fluid circuit 16 in a recirculation loop that includes the dispenser 118 while not dispensing through filter 92. Manifold 42 (FIG. 6) is modified to define a fluid path in which passageways 40 and 72 (FIG. 6) are continuous and passageways 74 and 48 (FIG. 6) are continuous because the solenoid valve 120 is in the continuous recirculation loop with the water purification unit 12 (FIG. 1).

Dispenser 118, if sufficiently ergonomic, may be removable from bracket 122 and usable for handheld dispensing remote from gooseneck 54. To that end, bracket 122 may be configured with, for example, a spring clip (not shown) that removably holds dispenser 118. After removal, the electrical cable 130, as well as conduits 76, 82, will have a length to permit handheld positioning of the dispenser 118 away from bracket 122. For example, the electrical cable 130 may be routed to circuit board 64 through sheath 83 (FIG. 2).

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A remote dispensing device for receiving a stream of water from a water purification unit, comprising:
    a dispensing gun capable of being hydraulically coupled with the water purification unit;
    a support structure positionable on a surface at a location remote from the water purification unit, said support structure including a base configured to sit atop the surface and a member configured to hold said dispensing gun above said base, said base including inlet and first outlet passageways hydraulically coupled to the water purification unit and a second outlet passageway hydraulically coupled to said dispensing gun; and
    an electrical component mechanically coupled to said base at the location remote from the water purification unit, said electrical component operative for regulating a recirculated flow of water supplied from and to the water purification unit via said inlet and said first outlet passageways, and said electrical component operative for regulating flow of water to said dispensing gun via said second outlet passageway.

2. The remote dispensing device of claim 1 wherein said electrical component is mounted to said base.

3. The remote dispensing device of claim 1 wherein said electrical component comprises:
    a flow control valve hydraulically coupling said dispensing gun with the water purification unit and configured to control a flow path for the flow of water from the water purification unit to said dispensing gun, said flow control valve having a first state in which said flow path to said dispensing gun is open and a second state in which said flow path to said dispensing gun is closed.

4. The remote dispensing device of claim 3 wherein said dispensing gun has an inlet, and further comprising:
    a manifold mounted to said base and defining said inlet, first outlet, and second outlet passageways, said manifold hydraulically coupling said flow control valve with the water purification unit.

5. The remote dispensing device of claim 4 wherein said flow control valve diverts the flow of water from said inlet passageway through said second outlet passageway to said inlet of said dispensing gun in said first state.

6. The remote dispensing device of claim 5 wherein said flow control valve blocks the flow of water from entering said second outlet passageway in said second state.

7. The remote dispensing device of claim 6 wherein said manifold, hydraulically couples said inlet passageway to said first outlet passageway when said flow control valve is in said second state to define a first recirculation loop for the flow of water between said manifold and the water purification unit.

8. The remote dispensing device of claim 7 wherein said dispensing gun has an outlet coupled normally with said inlet, said manifold includes a third outlet passageway hydraulically coupling said outlet with said first outlet passageway, when said flow control valve is in said first state, to define a second recirculation loop for the stream of water between said manifold and the water purification unit.

9. The remote dispensing device of claim 4 wherein said dispensing gun has an outlet coupled normally with said inlet, said third outlet passageway-hydraulically coupling said outlet with the water purification unit, when said flow control valve is in said first state, to define a circulation loop for the stream of water between said manifold and the water purification unit.

10. The remote dispensing device of claim 3 wherein said flow control valve is a solenoid valve.

11. The remote dispensing device of claim 10 wherein said solenoid valve is selected from the group consisting of flipper-style solenoid valves and rocker-style solenoid valves.

12. The remote dispensing device of claim 3 wherein said electrical component further comprises:
    a user interface electrically coupled with said flow control valve, said user interface including an electrical control and circuitry operative for switching said flow control valve between a first state in which said flow control valve directs the flow of water to said dispensing gun and a second state in which said flow control valve blocks the flow of water from flowing to said dispensing gun.

13. The remote dispensing device of claim 3 further comprising:
    a water level sensor coupled electrically with said circuitry and positioned in a container receiving water dispensed from said dispensing gun, said water level sensor operative to generate a signal used to determine a level of water in the container and said circuitry responsive to the electronic signal from said water level sensor for switching said flow control valve from said first state to said second state.

14. The remote dispensing device of claim 3 wherein said flow control valve recirculates the flow of water to the water purification unit when said flow control valve is in said first state.

15. The remote dispensing device of claim 3 wherein said flow control valve recirculates the flow of water to the water purification unit when said flow control valve is in said second state.

16. The remote dispensing device of claim 1 wherein said electrical component comprises:
    a user interface including an electrical control enabling user input to generate an electrical signal used to regulate the flow of water.

17. The remote dispensing device of claim 16 wherein said user interface further includes a display.

18. The remote dispensing device of claim 16 wherein said electrical component further comprises:
    a flow control valve configured to hydraulically couple said dispensing gun with the water purification unit, said flow control valve electrically coupled with said user interface.

19. The remote dispensing device of claim 18 wherein said electrical component further comprises:
   circuitry operative for switching said flow control valve between a first state in which said flow control valve directs the stream of water to said dispensing gun and a second state in which said flow control valve blocks the stream of water from flowing to said dispensing gun.

20. The remote dispensing device of claim 19 wherein said circuitry is operative to energize said flow control valve to provide said first state and to de-energize said flow control valve to provide said second state.

21. The remote dispensing device of claim 20 wherein said circuitry includes a pulse-width modulated driver operative for switching said flow control valve between said first and second states, said pulse-width modulated driver supplying a lower current to said flow control valve in said first state than supplied to said flow control valve over the time interval that said flow control valve is switched from said second state to said first state.

22. The remote dispensing device of claim 1 wherein said electrical component is configured to be electrically coupled with the water purification unit.

23. The remote dispensing device of claim 1 further comprising:
   a manifold mounted to said base and defining said inlet, first outlet, and second outlet passageways for directing the stream of water to said dispensing gun as determined by operation of the electrical component.

24. The remote dispensing device of claim 23 wherein said manifold is contained in a portion of said base.

25. The remote dispensing device of claim 1 wherein said member of said support structure comprises:
   a flexible arm having a first end coupled to said base and a second end opposite said first end; and
   a bracket mechanically coupled with said second end of said flexible arm, said bracket adapted to support said dispensing gun.

26. The remote dispensing device of claim 25 wherein said flexible arm has a construction capable of being bent into a curved shape between said first and second ends, said flexible arm being configured to hold said bracket in a fixed position after being bent into said curved shape.

27. The support of claim 26 wherein said flexible arm is a gooseneck.

28. The support of claim 25 where said flexible arm is rotatable relative to said base.

29. The remote dispensing device of claim 25 wherein said electrical component comprises:
   a flow control valve hydraulically coupling said dispensing gun with the water purification unit and configured to control a flow path for the stream of water from the water purification unit to said dispensing gun, said flow control valve having a first state in which said flow path to said dispensing gun is open and a second state in which said flow path to said dispensing gun is closed
   wherein said flow control valve is contained within said base of said support structure.

30. The remote dispensing device of claim 1 wherein said dispensing gun is removably held by said member of said support structure.

31. The remote dispensing device of claim 30, further comprising:
   a flexible conduit coupled with said dispensing gun, said flexible conduit including a coiled section capable of being uncoiled to effectively lengthen said flexible conduit when said dispensing gun is removed from said member of said support structure and moved relative to said support structure.

32. A remote dispensing device for receiving a stream of water from a water purification unit, comprising:
   a support structure positionable on a surface at a location remote from the water purification unit, said support structure including a base configured to sit atop the surface and a member connected with said base, said base including inlet and first outlet passageways hydraulically coupled to the water purification unit and a second outlet passageway;
   a dispensing gun supported by said member of said support structure at a location above said base, said dispensing gun configured to be hydraulically coupled with the water purification unit via said second outlet passageway for receiving the stream of water, and said base including a flow control valve having a first state in which the stream of water is dispensed from said dispensing gun and a second state in which the stream of water is returned to the water purification unit; and
   an electronic control mounted to said base and electrically coupled with said flow control valve, said electronic control operative for switching said flow control valve between said first and second states.

33. The remote dispensing device of claim 32 wherein said dispensing gun is removably held by said member of said support structure.

34. The remote dispensing device of claim 32 wherein said flow control valve is a solenoid valve.

35. The remote dispensing device of claim 34 wherein said solenoid valve is selected from the group consisting of flipper-style solenoid valves and rocker-style solenoid valves.

* * * * *

UNITED STATES PATENT AND TRADEMARK OFFICE
CERTIFICATE OF CORRECTION

PATENT NO. : 7,442,297 B2  Page 1 of 1
APPLICATION NO. : 11/068122
DATED : October 28, 2008
INVENTOR(S) : Thomas Joseph Larkner et al.

It is certified that error appears in the above-identified patent and that said Letters Patent is hereby corrected as shown below:

In column 5, line 48, before "manipulate", insert --may-- and in line 49, before "enter", insert --to--.

In column 7, line 32, after "53", insert --to--.

In Claim 7, column 16, line 5, after "manifold", delete --,--.

In Claim 9, column 16, line 18, change "passageway-hydraulically" to --passageway hydraulically--.

Signed and Sealed this

Eighth Day of December, 2009

David J. Kappos
*Director of the United States Patent and Trademark Office*